No. 611,675. Patented Oct. 4, 1898.
H. F. L. BROOKMEYER.
FOLDING CART.
(Application filed Dec. 1, 1897.)

(No Model.) 2 Sheets—Sheet 1.

Attest
Wm. F. Hall
F. L. Middleton

Inventor
H. F. L. Brookmeyer
by Eli Spear
Atty.

THE NORRIS PETERS CO., PHOTO-LITHO., WASHINGTON, D. C.

No. 611,675. Patented Oct. 4, 1898.
H. F. L. BROOKMEYER.
FOLDING CART.
(Application filed Dec. 1, 1897.)
(No Model.) 2 Sheets—Sheet 2.
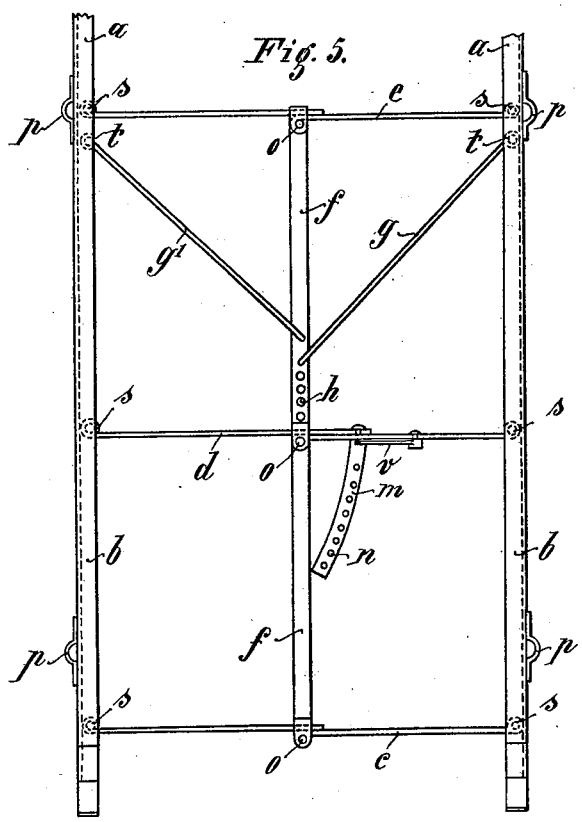
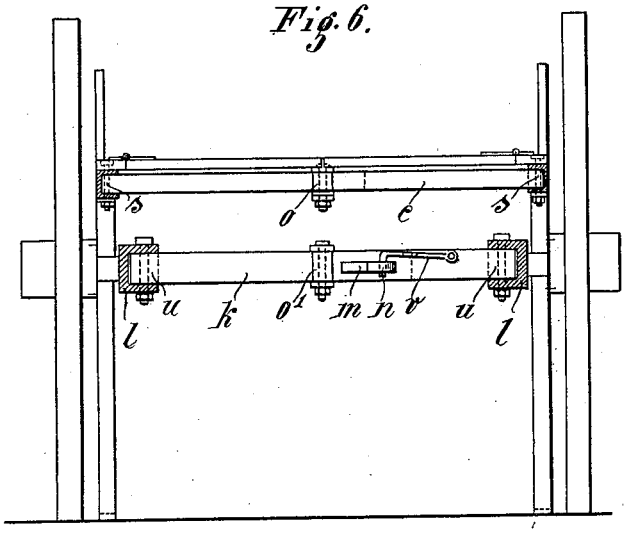
Attest
Wm. F. Hall.
F. L. Middleton.
Inventor
H. F. L. Brookmeyer
by Emil Spas
Atty.

UNITED STATES PATENT OFFICE.

HERRMANN FRIEDRICH LUDWIG BROOKMEYER, OF OSNABRÜCK, GERMANY.

FOLDING CART.

SPECIFICATION forming part of Letters Patent No. 611,675, dated October 4, 1898.

Application filed December 1, 1897. Serial No. 660,413. (No model.)

*To all whom it may concern:*

Be it known that I, HERRMANN FRIEDRICH LUDWIG BROOKMEYER, of Osnabrück, in the Kingdom of Prussia, Germany, have invented a new and useful Folding Cart Adjustable to Every Width of Gage, of which the following is a specification, reference being had therein to the accompanying drawings.

The object of this invention is a cart which can be readily folded or collapsed in such a manner as to reduce its breadth to a minimum.

Figure 1:
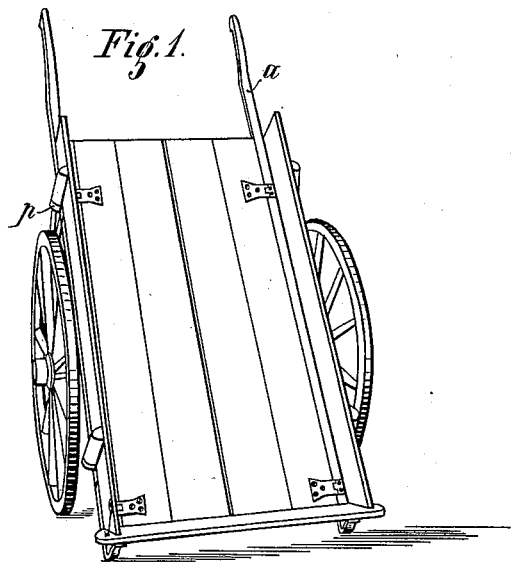
Figure 2:
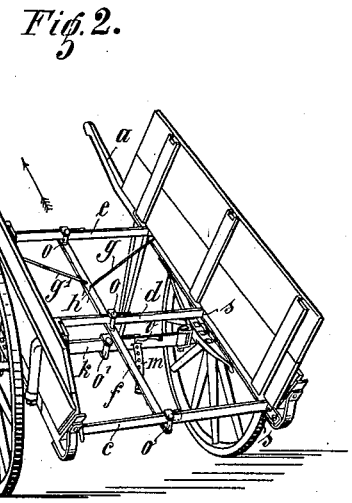
Figure 3:
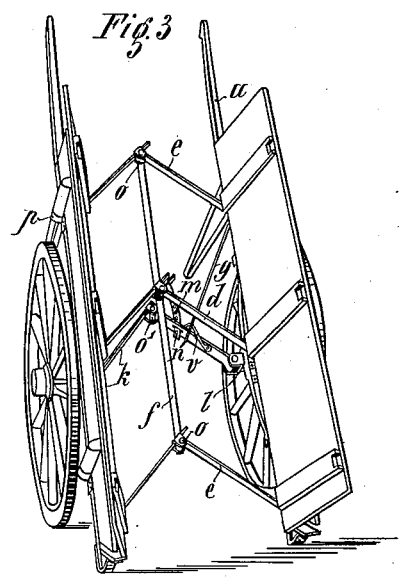
Figure 4:
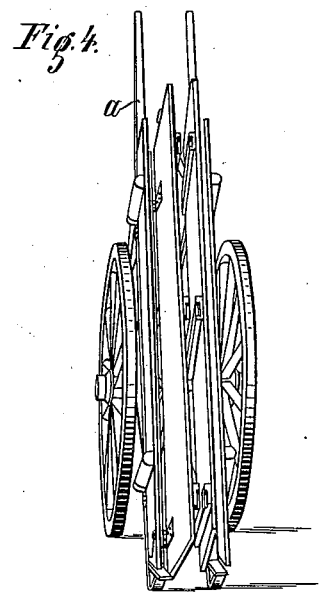

In the accompanying drawings, which illustrate the subject-matter of this invention, Figure 1 is the cart ready for use. Fig. 2 shows the same with the bottom folded. Fig. 3 shows the cart with the inner frame when it is about to be folded. Fig. 4 shows the cart entirely collapsed. Fig. 5 is a front view, and Fig. 6 a top view, of the said cart.

The cart consists, essentially, of an arrangement of axles which are hinged in order to be readily folded and upon which are loosely laid the boards forming the bottom, these boards being capable of sliding one within the other, consisting of several parts and being secured by means of hinges to the side boards or planks, if desired.

The accompanying drawings illustrate a hand-cart; but it is obvious that any street-vehicle could be arranged in a similar manner, such as hereinafter set forth.

The upper frame is built with U-irons $b$, arranged on both sides (see Figs. 1 to 5) of the cart and connected together by the transverse rods $c$, $d$, and $e$. These transverse rods can turn with the aid of plain hinges $s$ in the side rails $b$, being likewise centrally fixed by hinges $o$ to the pole $f$. It will be seen that when in this arrangement the rail $f$ is moved in the direction indicated by the arrow, Figs. 2 and 3, the side rails $b$ are brought into close proximity together. The fixing means are such that the rods $g$ and $g'$, which are arranged to turn at $t$ on the side rails, are bent over at their free ends in the form of hooks, which enter holes $h$ formed in the rail $f$, whereby no shifting of the parts can take place.

The upper frame is connected to the axles by means of springs. These axles are centrally hinged at $o'$, while their free ends turn, by means of the hinges $u$, in the wheel forks or irons $l$. A strap or curved bar $m$, furnished with a suitable number of perforations $n$, is connected to the axle, a hook $v$ entering one of these perforations, whereby the necessary stability is obtained when shifting the frame. At both sides of the rail $b$ bearings $p$ are provided and serve to receive the rail-ties in the usual manner.

When the cart is required to be collapsed after use, the hook $v$ is removed from the perforation of the bar $m$ and the hooked rod $g$ from those of the middle rail $f$, while the latter is displaced in the direction indicated by the arrow, whereupon the whole cart can be collapsed, one side being thus brought into close proximity to the other.

It is obvious that by the use of such a constructive arrangement a cart may be reduced to any suitable width.

The advantages of this invention are that the width of such a cart can be so reduced as to occupy the smallest possible amount of space when collapsed, as well as the ease with which this collapsing can be effected.

What I claim, and desire to secure by Letters Patent of the United States, is—

In a folding cart, the side bars U-shaped in cross-section, the three sets of two-part cross-bars connecting said side bars, the hinge connections between the parts of each cross-bar, one of the parts of the central cross-bar being extended beyond the hinge, the segment-plate connected to said extended end and passing through a slot in the other part, and the hook adapted to engage a series of perforations in said segment-plate, substantially as described.

In witness whereof I have hereunto set my hand in presence of two witnesses.

HERRMANN FRIEDRICH LUDWIG BROOKMEYER.

Witnesses:
 MAX CARL MEYER,
 W. G. GERLACH.